US011550117B2

(12) United States Patent
Uno et al.

(10) Patent No.: US 11,550,117 B2
(45) Date of Patent: Jan. 10, 2023

(54) LENS POSITION ADJUSTMENT DEVICE, CAMERA MODULE, INFORMATION DEVICE, AND CAMERA DRIVING METHOD

(71) Applicant: Huawei Technologies Co., Ltd., Shenzhen (CN)

(72) Inventors: Masaru Uno, Yokohama (JP); Atsushi Yoneyama, Yokohama (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 16/769,448

(22) PCT Filed: Dec. 23, 2017

(86) PCT No.: PCT/CN2017/118126
§ 371 (c)(1),
(2) Date: Jun. 3, 2020

(87) PCT Pub. No.: WO2019/119454
PCT Pub. Date: Jun. 27, 2019

(65) Prior Publication Data
US 2020/0386968 A1 Dec. 10, 2020

(51) Int. Cl.
*G03B 5/00* (2021.01)
*H04N 5/225* (2006.01)
(Continued)

(52) U.S. Cl.
CPC .............. *G02B 7/09* (2013.01); *G02B 27/646* (2013.01); *G03B 3/10* (2013.01); *G03B 5/00* (2013.01);
(Continued)

(58) Field of Classification Search
CPC ................ F03G 7/06143; G03B 30/00; G03B 13/32–36; G03B 3/10; H04M 1/0264; G02B 13/001–009; G02B 7/09; G02B 7/28–40; H04N 5/2254; H04N 5/2257; H04N 5/23212–232127
See application file for complete search history.

(56) References Cited

U.S. PATENT DOCUMENTS 8,866,918 B2 10/2014 Gregory et al.
2007/0280668 A1* 12/2007 Kubo ....................... G02B 7/04
396/133
(Continued)

FOREIGN PATENT DOCUMENTS

CN 101248270 A 8/2008
CN 101408658 A 4/2009
(Continued)

*Primary Examiner* — Paul M Berardesca
(74) *Attorney, Agent, or Firm* — Conley Rose, P.C.

(57) ABSTRACT

A lens position adjustment device includes a lens holder, a first shape memory alloy (SMA) wire and a second SMA wire. The lens holder holds a lens. The first SMA wire is configured to move the lens holder in a first direction along an optical axis of lens. The second SMA wire is configured to move the lens holder in a second direction along the optical axis. The second direction is opposite to the first direction. The lens holder is moved in the first or second direction along the optical axis through energizing the first SMA wire and the second SMA wire and controlling a force that moves the lens holder.

20 Claims, 15 Drawing Sheets

(51) Int. Cl.
*G03B 3/10* (2021.01)
*H04N 5/232* (2006.01)
*G02B 7/09* (2021.01)
*G02B 27/64* (2006.01)

(52) U.S. Cl.
CPC ......... *H04N 5/2254* (2013.01); *H04N 5/2257* (2013.01); *H04N 5/23212* (2013.01); *H04N 5/23287* (2013.01); *G03B 2205/0015* (2013.01); *G03B 2205/0076* (2013.01)

(56) References Cited

U.S. PATENT DOCUMENTS

| | | |
|---|---|---|
| 2009/0034094 A1 | 2/2009 | Noda et al. |
| 2009/0303621 A1 | 12/2009 | Sue et al. |
| 2011/0030368 A1 | 2/2011 | Kume |
| 2011/0091193 A1 | 4/2011 | Lim et al. |
| 2011/0235194 A1 | 9/2011 | Nobe et al. |
| 2011/0249131 A1 | 10/2011 | Topliss et al. |
| 2012/0019675 A1 | 1/2012 | Brown |
| 2013/0222685 A1 | 8/2013 | Topliss et al. |
| 2015/0135703 A1 | 5/2015 | Eddington et al. |
| 2015/0346507 A1 | 12/2015 | Howarth |
| 2017/0289455 A1* | 10/2017 | Hu ........................ H04N 5/2253 |
| 2018/0348593 A1* | 12/2018 | Brown ..................... G03B 3/10 |
| 2019/0136839 A1* | 5/2019 | Miller ..................... G03B 3/10 |
| 2020/0310081 A1* | 10/2020 | Chen ........................ G02B 7/08 |

FOREIGN PATENT DOCUMENTS

| | | |
|---|---|---|
| CN | 101825759 A | 9/2010 |
| CN | 101878443 A | 11/2010 |
| CN | 102043222 A | 5/2011 |
| CN | 102150073 A | 8/2011 |
| CN | 102207603 A | 10/2011 |
| CN | 104335101 A | 2/2015 |
| CN | 103168264 B | 10/2015 |
| CN | 104204935 B | 5/2017 |
| EP | 2025932 A2 | 2/2009 |
| JP | 2005337262 A | 12/2005 |
| JP | 2009037059 A | 2/2009 |
| JP | 2014010380 A | 1/2014 |
| WO | 2010089529 A1 | 8/2010 |
| WO | 2012038703 A2 | 3/2012 |
| WO | 2017134456 A1 | 8/2017 |

* cited by examiner

LENS POSITION ADJUSTMENT DEVICE, CAMERA MODULE, INFORMATION DEVICE, AND CAMERA DRIVING METHOD

CROSS-REFERENCE TO RELATED APPLICATIONS

This application is a U.S. National Stage of International Patent Application No. PCT/CN2017/118126 filed on Dec. 23, 2017, which is hereby incorporated by reference in its entirety.

TECHNICAL FIELD

The present invention relates to a lens position adjustment device, a camera module, an information device, and a camera driving method, and in particular relates to a mechanism of an autofocus (AF) actuator in a camera.

BACKGROUND ART

Cameras typically incorporate various actuators for autofocusing (AF) purposes depending upon their principles of driving and/or driving mechanisms. For example, a coil is wound on and around a side surface of a lens barrel held by a plate spring, magnets are arranged close to an outer surface of the lens barrel, and thus a voice coil motor (VCM) is configured. In addition, when an electric current is made to flow in the coil, the lens barrel is moved by a force by which the coil is acted upon from an external magnetic field so as to realize intended driving functionality for the autofocusing purposes.

Meanwhile, there have been increasing needs for actuators with a simple structure for relatively small cameras to be incorporated into information devices such as smartphones. However, it is often difficult to simplify the structure of a driving mechanism on a traditional actuator. For instance, in the case of the above-mentioned AF driving mechanism that holds the lens barrel using plate springs.

It is therefore an object of the present invention to provide a lens position adjustment device, a camera module, an information device, and a method of driving a camera that implement AF mechanisms with a simplified structure.

SUMMARY OF INVENTION

According to a first aspect, a lens position adjustment device is provided, which includes: a lens holder holding a lens; a first shape memory alloy (SMA) wire configured to move the lens holder in a first direction along an optical axis of the lens; and a second SMA wire configured to move the lens holder in a second direction, which is opposite to the first direction, along the optical axis.

The lens holder is moved in the first or second direction along the optical axis through energizing the first SMA wire and the second SMA wire and controlling a force that moves the lens holder.

In accordance with the first aspect of the embodiment, it is made possible to implement a lens position adjustment device having an AF mechanism with a simple structure.

According to a second aspect of the embodiment, a lens position adjustment device is provided, which comprises: a lens holder holding a lens; and at least one shape memory alloy (SMA) wire configured to move the lens holder along an optical axis of the lens.

The lens holder is moved in a first direction or second direction opposite to the first direction along the optical axis through energizing the at least one SMA wire and controlling a force that moves the lens holder.

The device further comprises a supporting section provided in a housing of the lens position adjustment device and configured to support the at least one SMA wire.

The at least one SMA wire is configured such that the lens holder is held by an end of the at least one SMA wire and the supporting section.

The supporting section includes a groove for supporting the at least one SMA wire.

The at least one SMA wire is looped around the groove with two or more turns so as to be supported by the supporting section.

In accordance with the second aspect of the embodiment, it is made possible to implement an AF-driven lens position adjustment device having a mechanism with a simple structure.

According to a third aspect of the embodiment, a camera module is provided which comprises the lens position adjustment device according to the first or second aspect.

In accordance with the third aspect of the embodiment, it is made possible to implement a camera module that includes a lens position adjustment device having an AF mechanism with a simple structure.

According to a fourth aspect of the embodiment, provided is an information device comprising the lens position adjustment device according to the first or second aspect.

In accordance with the fourth aspect of the embodiment, it is made possible to implement an information device implementing a lens position adjustment device having an AF mechanism with a simple structure.

According to a fifth aspect of the embodiment, provided is a method of driving a lens position adjustment device including a lens holder holding a lens, a first shape memory alloy (SMA) wire configured to move the lens holder in a first direction along an optical axis of the lens, and a second SMA wire configured to move the lens holder in a second direction along the optical axis. The second direction is opposite to the first direction.

The method comprises the steps of: energizing the first SMA wire to move the lens holder in the first direction along the optical axis; and energizing the second SMA wire to move the lens holder in the second direction along the optical axis.

In accordance with the fifth aspect of the embodiment, it is made possible to adjust a position of a lens using an AF mechanism with a simple structure.

According to a sixth aspect of the embodiment, provided is a computer program for causing a computer to perform the method of driving the lens position adjustment device.

In accordance with the sixth aspect of the embodiment, it is made possible to provide a computer program for adjusting a position of a lens using an AF mechanism with a simple structure.

BRIEF DESCRIPTION OF DRAWINGS

To describe the technical solutions in the embodiments more clearly, the following briefly describes the accompanying drawings required for describing the present embodiments. Apparently, the accompanying drawings in the following description depict merely some of the possible embodiments, and a person of ordinary skill in the art may still derive other drawings, without creative efforts, from these accompanying drawings, in which.

DESCRIPTION OF EMBODIMENTS

The following clearly and completely describes the technical solutions in the embodiments disclosed herein with reference to the accompanying drawings regarding the embodiments disclosed herein. It will be appreciated that the embodiments described herein are some rather than all of the possible embodiments. All other embodiments obtained by a person of ordinary skill in the art based on the embodiments disclosed herein without creative efforts shall fall within the protection scope of the present invention.

Figure 1:
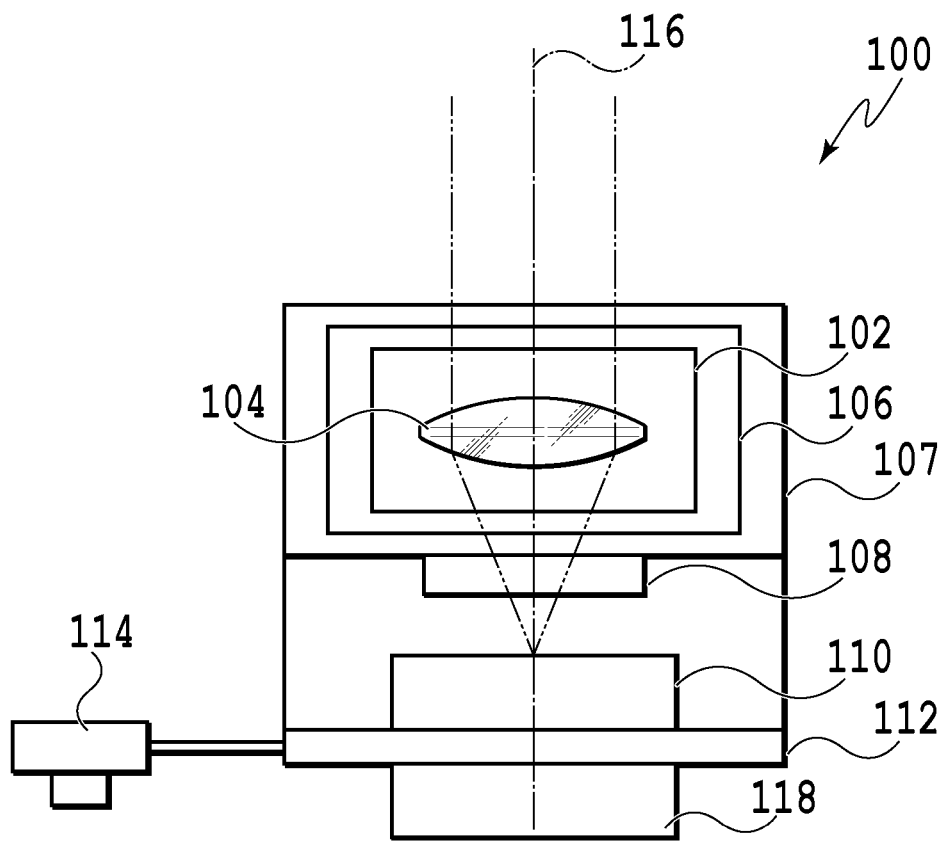
FIG. 1 is a diagram illustrating a configuration of a camera module in accordance with an embodiment.

FIG. 1 is a diagram that illustrates an exemplary configuration of a camera module in accordance with a first embodiment. The camera module 100 may be connected or included, for example, to information devices such as mobile phones, smartphones, tablets and the like. In the camera module 100, a lens holder 102 which includes an optical system (i.e., lens) 104 is accommodated in an auto-focus (AF) actuator 106, and the AF actuator 106 is in turn accommodated in an image stabilization device 107 (which may also be referred to as a camera shake correction device). An IR cut filter 108 is attached to the image stabilization device 107. An image sensor 110 and a control unit 118 are arranged in a housing of the camera module 100.

The lens 104 forms an optical image of a subject, which is positioned at an upper region in the figure, via the IR cut filter 108 onto a light-receiving surface of the image sensor 110. The lens 104 is controlled by the AF actuator 106 and moved in the direction of an optical axis 116 so that the position of the focal point can be adjusted. Specifically, the AF actuator 106 is configured to move the lens 104 on a trial basis in the direction of the optical axis 116, and evaluate the contrast (frequency component) of an image signal generated by the image sensor 110. In addition, when the contrast in the image signal increases, the AF actuator 106 will continue the movement in the one direction. Meanwhile, when the frequency component in the image signal decreases past a peak, the AF actuator 106 will move the lens 104 in an opposite direction so as to perform in-focus determination.

The image stabilization device 107 is capable of moving the AF actuator 106 in a direction perpendicular to the optical axis 116. In the course of the image stabilization process, motions of the camera are detected by a vibration gyroscope, the position of the AF actuator 106 is moved by the amount equivalent to the deviation from the position where light should reach in order to ensure that the optical image is properly formed by an imaging element of the image sensor 110.

The camera driving system includes the AF actuator 106 and the image stabilization device 107 illustrated in FIG. 1.

The IR cut filter 108, which blocks wavelengths that may cause heating while passing visible light, is arranged between the image stabilization device 107 and the image sensor 110.

The image sensor 110, which is provided on a board 112, is configured by a semiconductor that converts an optical image received from the lens 104 into an electric signal. Solid state imaging devices such as CCD (Charge-Coupled Device) and CMOS (Complementary Metal Oxide Semiconductor) may be used as the image sensor 110. The control unit 118 is responsible for controlling the AF actuator 106 and the image stabilization device 107.

The connector 114 is connected to an external electronic device. The connector 114 is configured to deliver the electric signal generated by the image sensor 110 to the external device via the connector 114. In addition, the connector 114 delivers an electric signal received from the external device to the camera module 100 as the power source so that the electronic components in the camera module 100 are powered thereby for their individual operations.

It should be noted that the camera module illustrated in FIG. 1 may be implemented, for example, on various information devices such as mobile phones, smartphones, and tablet PCs. In addition, as will be descried later, at least two camera modules may be implemented on an information device as the camera module.

Figure 2:
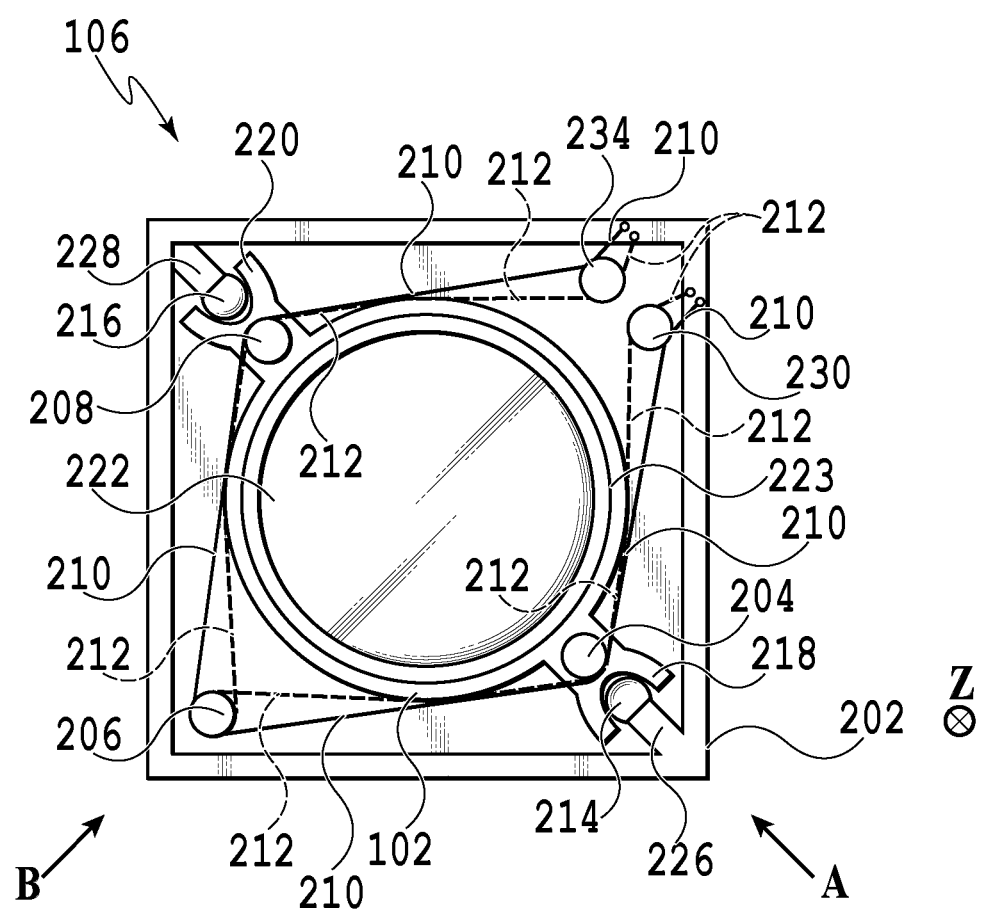
FIG. 2 is a top view of an AF actuator in accordance with an embodiment.

FIG. 2 is a top view that illustrates an internal structure of the AF actuator in accordance with the first embodiment. The AF actuator 106 includes a lens barrel 223 adapted to hold a lens 222 in a housing 202. The lens barrel 223 is supported by the lens holder 102. The lens holder 102 has two arms 218 and 220 each projecting outward from a side of the lens holder 102. U-shaped engaging sections are provided at the ends of these two arms, respectively. Meanwhile, ball supporting sections 226 and 228 extend inward from an inner wall of the housing 202 along one diagonal line thereof. Balls 214 and 216, which serve as a guiding section, are supported by the ends of the ball supporting sections 226 and 228, respectively. It should be noted that a shape of the engaging section is not limited to U-shape and it may take a wide variety of forms. In this case, a shape of the guiding section may take an appropriate shape to engage with the engaging section.

The balls 214 and 216 may be rotatably supported by the ball supporting sections 226 and 228. The ball 214 is adapted to be brought into engagement with the U-shaped portion of the arm 218. Likewise, the ball 216 is adapted to be brought into engagement with the U-shaped portion of the arm 220. Engagement looseness is typically provided to a minor extent between the inner side of the U-shaped portions and the balls 214 and 216. The lens holder 224 is capable of moving in a Z-axis direction, which extends along the optical axis, as it is guided by the balls 214 and 216. Also, shapes of the guiding section and engaging section are not limited to those shown in FIG. 2.

It should be noted that the guiding section in the example illustrated in FIG. 2 is formed by a ball-shaped member and the engaging section is shaped and dimensioned to surround the ball-shaped portion, but either of the engaging section and the guiding section may be formed by a ball-shaped member while the other is shaped and dimensioned to surround the ball-shaped portion.

Tension poles 204 and 208 are provided on the arms 218 and 220 of the lens holder 102, respectively. The tension poles 204 and 208 each project from the arms 218 and 220, respectively, in a positive direction of the Z-axis, and have grooves for accepting therein the shape memory alloy (SMA) wires 210 and 212, respectively.

The first SMA wire 210 and the second SMA wire 212 are configured and arranged to support the lens holder 102 via the locations of the two tension poles 204 and 208 symmetrical about the center of the lens 222.

FIG. 3 is a perspective view that illustrates the arms and the tension poles of FIG. 2. Referring to FIG. 3A, a groove 302 is formed in the tension pole 204 provided on the arm 218, and the SMA wire 212 is attached to the groove 302. In addition, with regard to the lower side of the arm 218 as well, in the similar manner, the tension pole 204 projects in a negative direction of the Z axis, in other words, toward the lower side in the figure and a groove is formed therein. The SMA wire 210 is attached to this groove. The ball supporting section 226a and 226b, which support the balls 214a and 224b, respectively, are arranged in the Z-axis direction. The arm 218 is capable of moving in the direction indicated by the arrow D as it is guided by the ball 214a and 214b as the guiding section with the SMA wires 212 and 210 moved in the Z-axis direction.

Figure 3A:
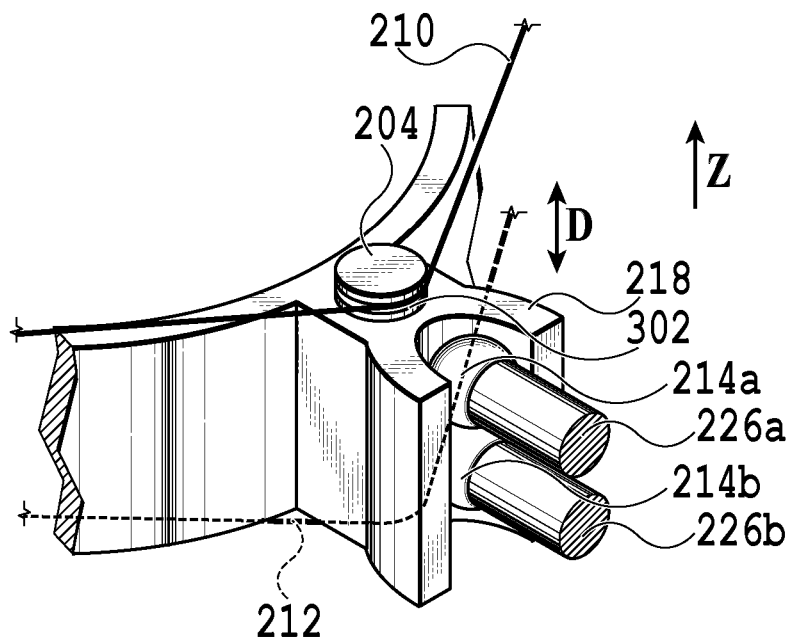
FIGS. 3A-3E are perspective views illustrating exemplary features of the AF actuator and relevant portions.
Figure 3B:
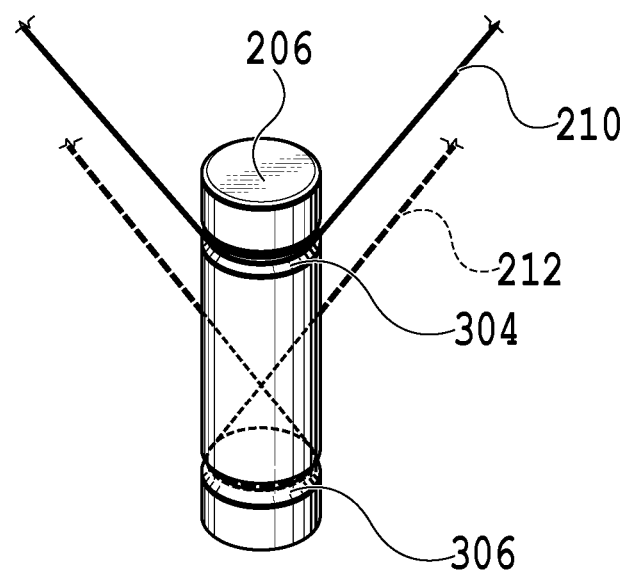
Figure 3C:
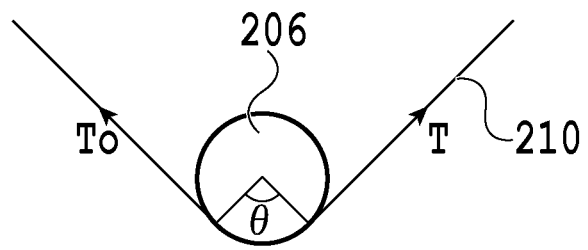

Referring to FIG. 3B, a tension pole 206 serves as a support section for supporting the first SMA wire 210 and the second SMA wire 212. Grooves 304 and 306 are formed in the tension pole 206. The grooves 304 and 306 are shaped and dimensioned to support the first SMA wire 210 and the second SMA wire 212, respectively, in a state where these two wires are spaced from each other. The SMA wire 210 is attached to the groove 304 and the SMA wire 212 is attached to the groove 306. The SMA wire, which is formed of shape memory alloy formed linearly or in a strand-like manner, is a wire that contracts due to the Joule heat generated by the current and expands as it is air-cooled, and, for example, Ni—Ti (nickel-titanium) alloy may be used therefor. Preferably, the SMA wires 210 and 212 are looped around the groove 304 and 306, respectively, by two or more turns so as to be attached thereto. This is described by the example illustrated in FIG. 3C.

Assuming that the tension $T_0$ exists in one end of the SMA wire 210 in contact with the tension pole 206, the force T by which the SMA wire 210 is slid and moved on the tension pole 206 when the other end of the SMA wire 210 is pulled will be indicated by the following expression:

$$T=T_0 e^{\mu\theta}$$

where ρ is the friction coefficient and θ is the contact angle or winding angle (rad). Since the tension T increases exponentially with respect to the winding angle θ, the SMA wire 210 is fixed to the tension pole 206 with a considerably large force through just a couple of turns around the tension pole 206.

Figure 3D:
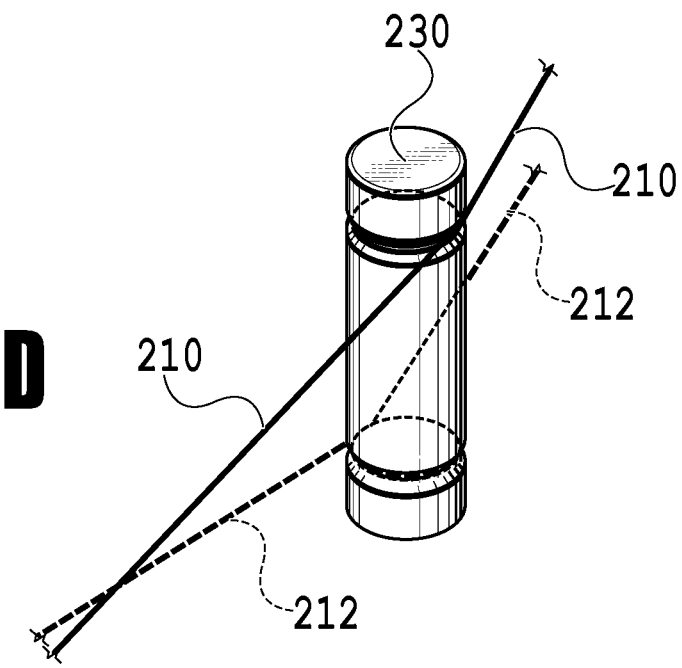
Figure 3E:
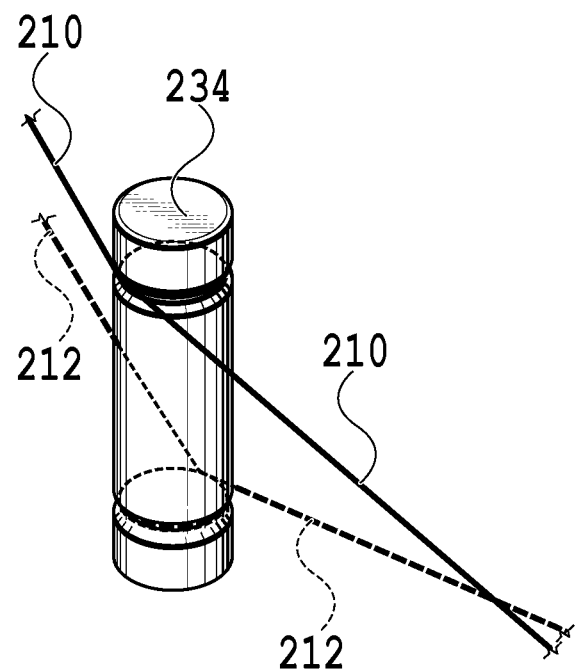

Referring to FIGS. 3D and 3E, tension poles 230 and 234 serves as a support section for supporting the first SMA wire 210 and the second SMA wire 212. Two grooves are formed in each of the tension poles 230 and 234. The grooves are shaped and dimensioned to support the first SMA wire 210 and the second SMA wire 212, respectively, in a state where these two wires are spaced from each other. The SMA wire 210 is attached to one groove and the SMA wire 212 is attached to the other groove. Preferably, each of the SMA wires 210 and 212 is looped around each groove by two or more turns so as to be attached thereto.

The configuration for looping the SMA wires around the tension pole as described above can be applied to a lens position adjustment device for moving a lens holder by a single SMA wire in the direction of the optical axis. In this case, the lens position adjustment device includes: a lens holder holding a lens; and at least one SMA wire configured to move the lens holder along an optical axis of the lens. The lens holder is moved in the first direction or second direction opposite to the first direction along the optical axis through energizing the at least one SMA wire and controlling a force that moves the lens holder. Also, the device further includes a supporting section provided in a housing of the lens position adjustment device and configured to support the at least one SMA wire; the at least one SMA wire being configured such that the lens holder is held by an end of the at least one SMA wire and the supporting section; the supporting section including a groove for supporting the at least one SMA wire; and the at least one SMA wire being looped around the groove with two or more turns so as to be supported by the supporting section.

The first SMA wire 210 and the second SMA wire 212 hold the lens holder 102 via their portions at the arms 218 and 220 between their respective ends and the tension pole 206 in a manner which will be described later.

Figure 4A:
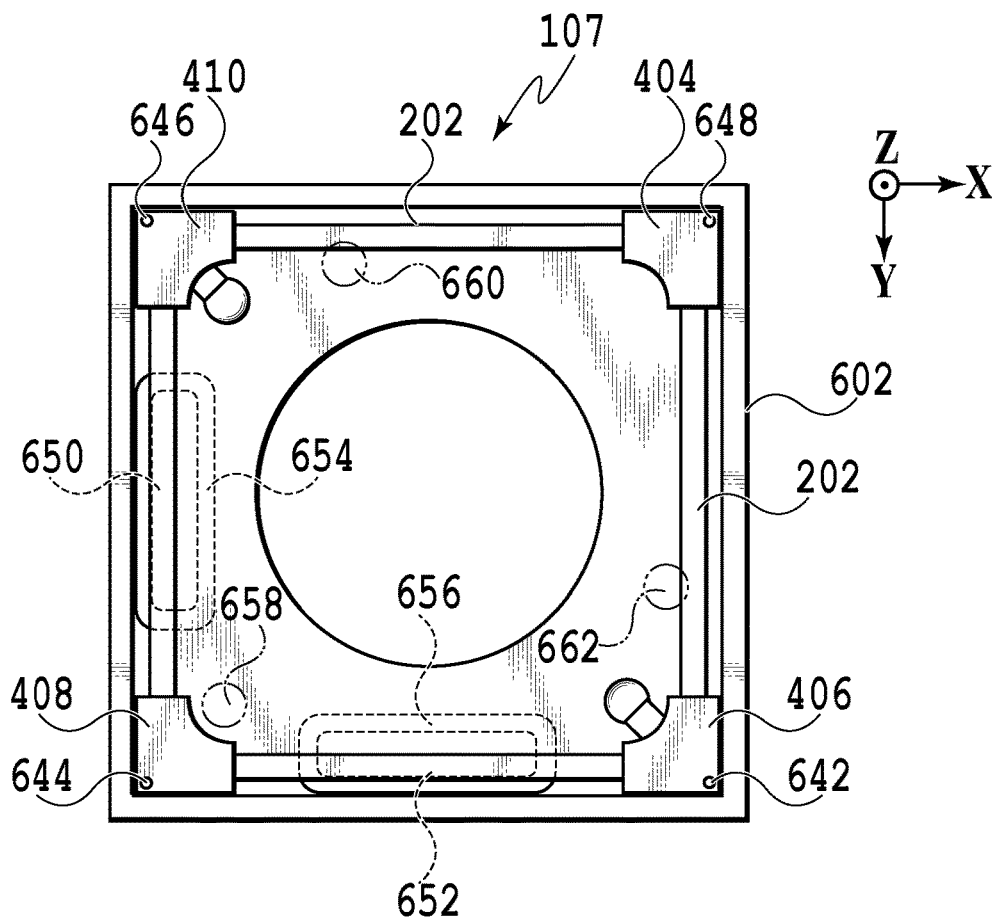
FIGS. 4A and 4B are a top view and a side view of an example of an image stabilization device.
Figure 4B:
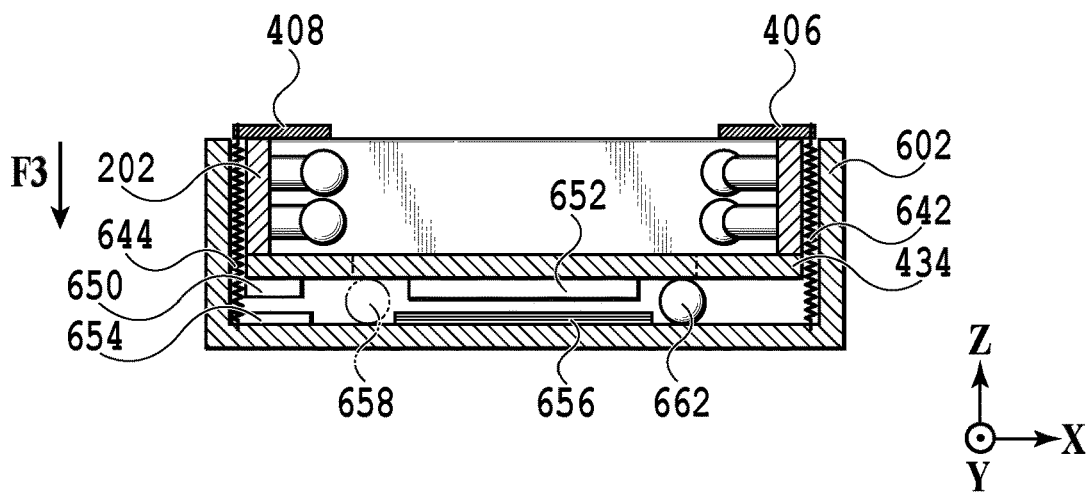
Figure 5:
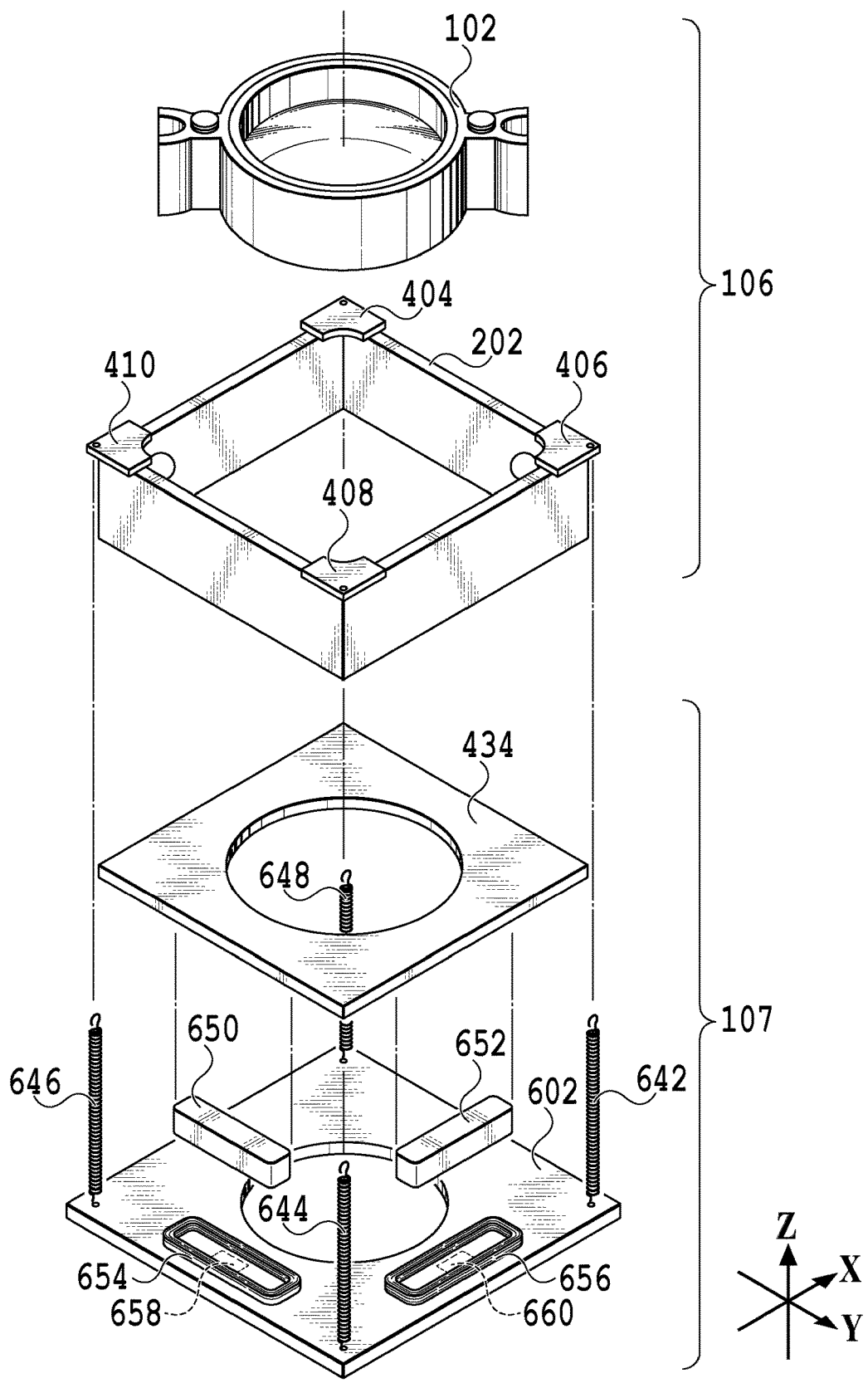
FIG. 5 is an exploded perspective view of a lens position adjustment device in accordance with an embodiment.

FIG. 4 illustrates an exemplary configuration of the image stabilization device, where FIG. 4A is a top view and FIG. 4B is a side view. In addition, FIG. 5 is an exploded perspective view of the AF actuator and the image stabilization device in accordance with the embodiment. A lens position adjustment device according to the embodiment may include the AF actuator and the image stabilization device.

The image stabilization device 107 includes the housing 202 of the AF actuator 106. Spring supporting sections 404, 406, 408, and 410 are attached to the housing 202 of the AF actuator 106 at upper four locations thereof, respectively. The springs 648, 642, 644, and 646 are attached to the spring supporting section 404, 406, 408, and 410, respectively. By virtue of this configuration, the housing 202 of the AF actuator 106 is attached via the springs 642, 644, 646, and 648 to the housing 602 of the image stabilization device 107 and biased toward the bottom portion of the housing 602 with a force indicated by the arrow F3.

Magnets 650 and 652 are arranged at the lower side of the housing 202 of the AF actuator 106. Meanwhile, the coils 654 and 656 are attached on the bottom portion of the housing 602 of the image stabilization device such that the coils 654 and 656 are arranged opposed to the magnets 650 and 652, respectively. Optical Image Stabilization (OIS) balls 658, 660, and 662 are placed between the housing 202 of the AF actuator 106 and the housing 602 of the image stabilization device 107. A gap is created between the magnets 650, 652 and the coils 654, 656. The gap is provided by a diameter of the balls 658, 660 and 662. By virtue of this configuration, the magnets 650 and 652 are acted upon by the force through controlling the current flowing in the coils 654 and 656, and the AF actuator 106 is made to be moved along with the housing 202 along an axis perpendicular to the optical axis (X- and Y-axes).

Position sensors 658 and 660 are arranged under the housing 602. The position sensors 658 and 660 are configured to output position detection signals for use in image stabilization control. It should be noted that a magnetic-type position detection unit that includes a Hall element may be used as the position sensor 658 and 660. Meanwhile, in place of the Hall element, other position detection units (position sensors) may also be used as appropriate including an optical-type position detection unit such as a photoreflector.

It should be noted that the arrangement of the magnets and the coils is not limited to the illustrated example of FIG. 4 and, for example, the magnets may be arranged at the sides of the housing of the AF actuator. In addition, the positions of the magnets and the coils may be substituted for by each other. Further, each of the magnets 650 and 652 may be formed by multiple magnet pieces.

Figure 6A:
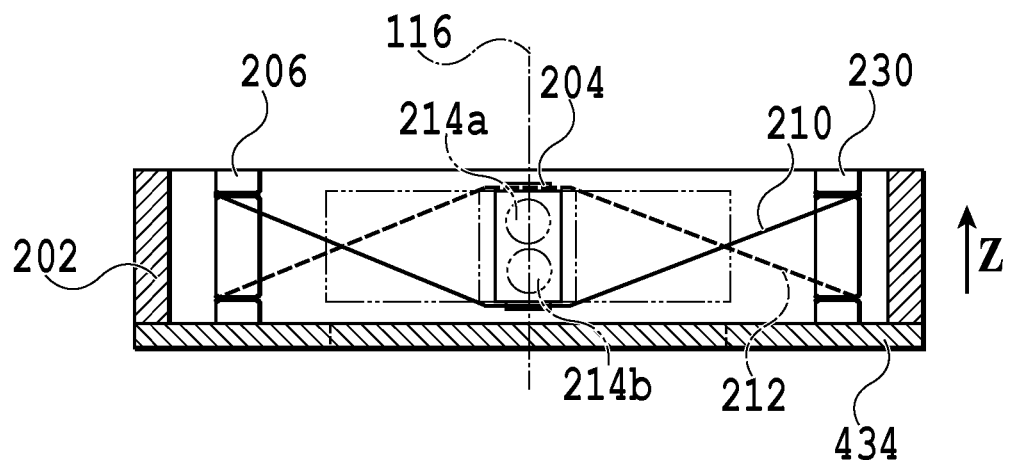
FIGS. 6A and 6B are side views of an example of the AF actuator.

The mechanism of the AF actuator illustrated in FIG. 2 and the operation in driving thereof will now be described below with reference to FIG. 6, where FIG. 6A is a side view of the AF actuator of FIG. 2 viewed in the direction indicated by the arrow A. One SMA wire 210 is looped around an upper portion of the tension pole 230, and attached to a lower portion of the tension pole 204, and looped around the upper portion of the tension pole 206. In addition, The other SMA wire 212 is likewise looped around a lower portion of the tension pole 230, attached to the upper portion of the tension pole 204, and looped around the lower portion of the tension pole 206. Referring to FIG. 6, the SMA wires 210 and 212 intersect with each other at a location between the tension pole 230 and the tension pole 204 and intersect with each other again at another location between the tension pole 204 and the tension pole 206. The SMA wire 210 biases the tension pole 204 in the Z-axis direction along the optical axis toward the subject, in other words, toward the upper side of the figure, and the SMA wire 212 biases the tension pole 204 toward the direction away from the subject, in other words, toward the lower side in the figure. The SMA wires 210 and 212 are thus individually responsible for the biasing functionality. Accordingly, the lens holder 102 is and held by the first SMA wire 210 and the second SMA wire 212 under application of the force biasing in the first direction (the direction toward the subject) and the force biasing in the second direction (the direction away from the subject).

Figure 6B:
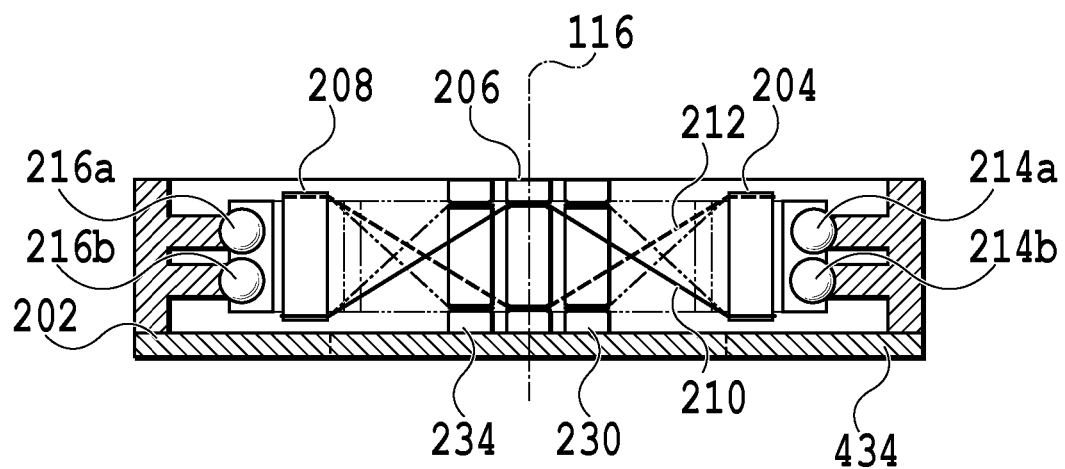

FIG. 6B is a side view of the AF actuator 106 illustrated in FIG. 2 viewed in the direction indicated by the arrow B. In the same manner as in FIG. 6A, the SMA wire 210 looped around the upper side of the tension pole 206 is attached to the lower portion of the tension pole 208 and looped around an upper portion of the tension pole 234. The SMA wire 212 looped around the lower side of the tension pole 206 is attached to the upper side of the tension pole 208 and looped around a lower portion of the tension pole 234.

In the manner described above, when the AF actuator is not driven, the tension pole is fixed to the central portion of the housing with a gap provided with respect to the bottom portion of the housing 202.

The operation of the AF actuator illustrated in FIG. 2 will be described with reference to FIGS. 7 and 8.

The driving method for driving the AF actuator 106 includes the steps of:

energizing the first SMA wire 210 and thereby causing the lens holder 102 to move inside of the housing 202, along the optical axis 116, and in the first direction; and energizing the second SMA wire 212 and thereby causing the lens holder 102 to move inside of the housing 202, along the optical axis 116, and in the second direction that is opposite to the first direction.

The first SMA wire 210 and the second SMA wire 212 each contract under energization, as wires as a whole, trying to take a straight shape, by virtue of which a force along the optical axis acts upon the lens holder 102. As a result, the lens holder 102 is allowed to move in the first or second direction.

Figure 7A:
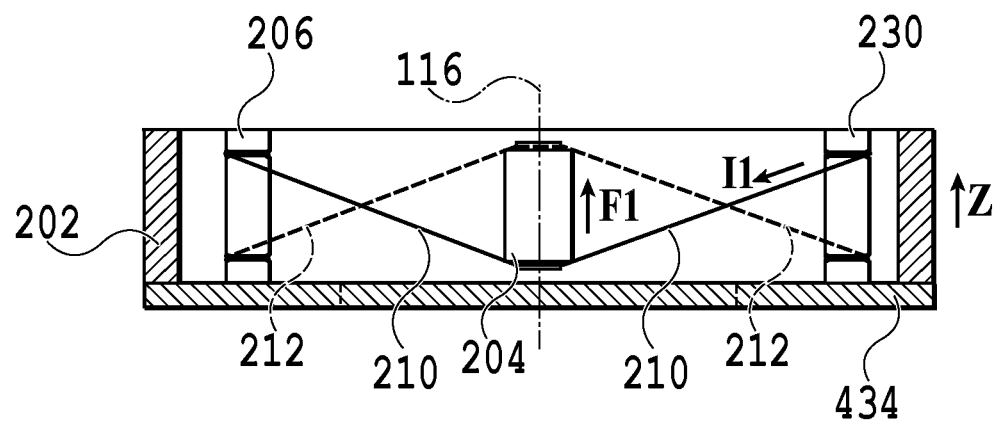
FIGS. 7A and 7B are diagrams illustrating exemplary operation of the AF actuator.
Figure 7B:
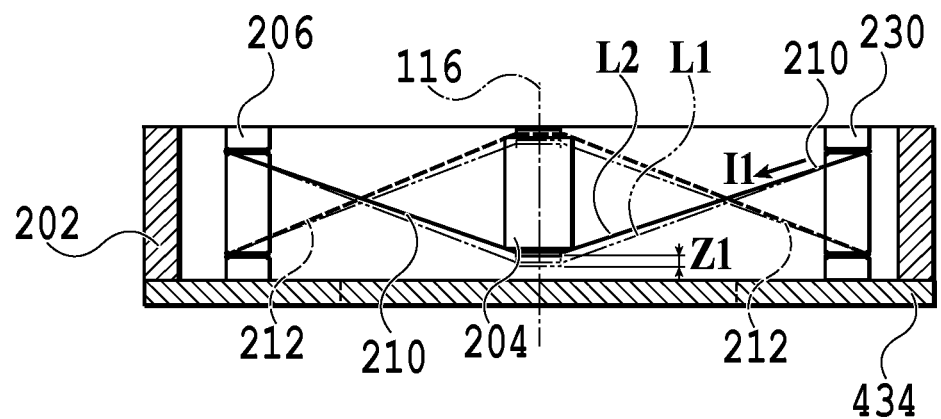

FIG. 7 and FIG. 8 are side views of the AF actuator 106 illustrated in FIG. 2 viewed in the direction indicated by the arrow A. In FIG. 7A, when a current I1 is made to flow in the SMA wire 210, heat is generated in the SMA wire 210 and the SMA wire 210 contracts due to this heat. As a result of this contraction, the length of the wire 210 from the tension pole 230 to the tension pole 204 changes from L1 to L2 (which is shorter than L1). The creation of the force is a direct consequence of not the change in the length but the change in the shape, and in the same manner, the wire 210 urges itself to take a straight shape. By virtue of the change at issue in the shape, as illustrated in FIG. 7B, the force F1 acts upon the SMA wire 210 along the optical axis toward the subject, i.e., toward the upper side of the figure, so that the SMA wire 210 moves by the distance Z1. In the course of the movement of the SMA wire 210, the tension pole 204 moves as well, causing the tension wire 212 to extend.

Figure 8A:
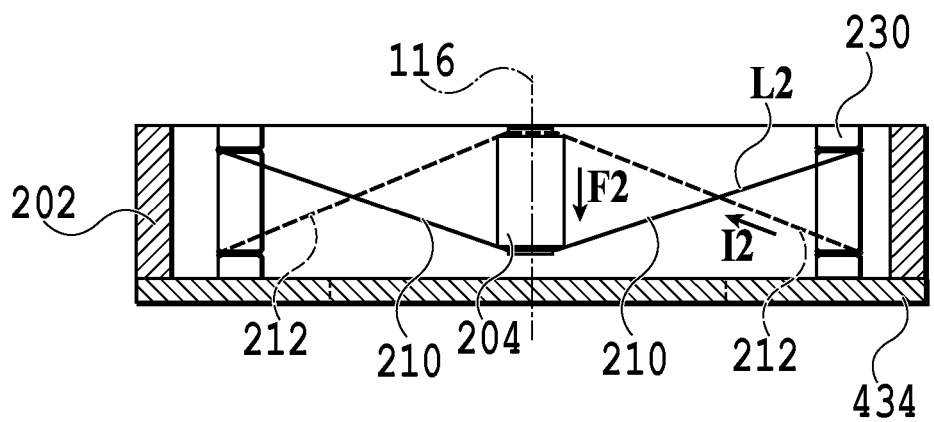
FIGS. 8A-8C are diagrams illustrating exemplary operation of the AF actuator.
Figure 8B:
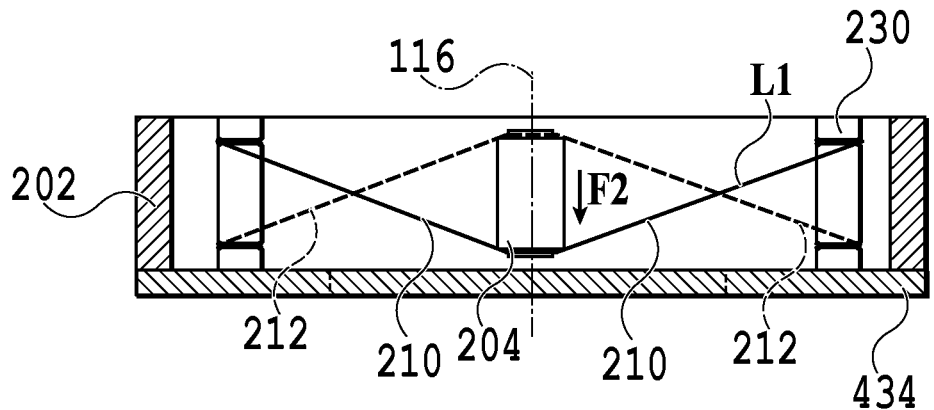
Figure 8C:
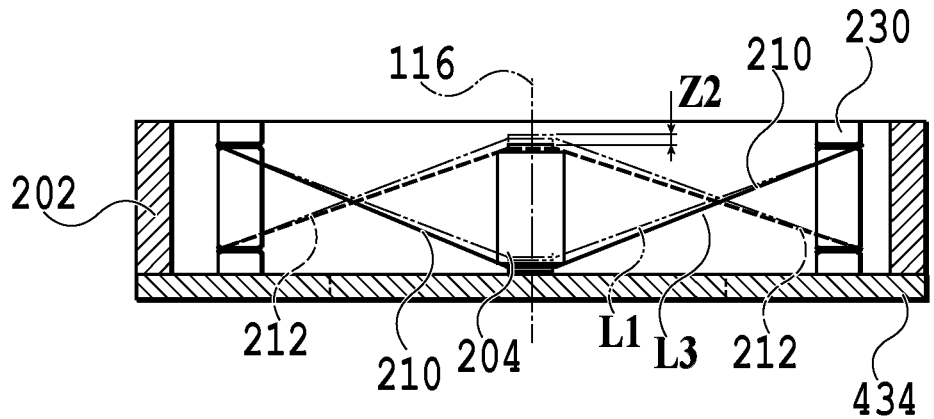

The movement in the opposite direction along the Z-axis is described with reference to FIG. 8. The contracted SMA wire can be extended by air cooling. For this reason, the lens holder may be moved in the direction of the optical axis by means of a single SMA wire. However, since air cooling takes time, the SMA wire is made to extend by energizing the other of the pair of SMA wires. Specifically, as illustrated in FIG. 8A, when the current I2 is made to flow in the SMA wire 212 in a state where the tension pole 204 is moved in the direction toward the subject, then heat is generated in the SMA wire 212 and the SMA wire 212 contracts due to this heat. As a result of the contraction, a force F2 acts upon the tension pole 204 in the direction away from the subject, so that the tension pole 204 is moved toward the lower side. In the course of the movement of the tension pole 204, as illustrated in FIG. 8B, the length of the SMA wire 210 from the tension pole 230 to the tension pole 204 is increased from L2 to L1. When the SMA wire 212 is further energized, the SMA wire 212 contracts as illustrated in FIG. 8C, the length of the SMA wire increases from L1 to L3, and the tension pole 204 is moved by the distance Z2 away from the start position. For example, in a conventional autofocusing (AF) driving mechanism which holds a lens barrel by a plate spring as described above, it is necessary to provide a mechanism for stably maintaining the position of the lens barrel within the housing, which makes it difficult to simplify the structure of the mechanism as such. In accordance with the embodiment, it is made possible to implement a lens position adjustment device having an AF mechanism with a simple structure.

Figure 9:
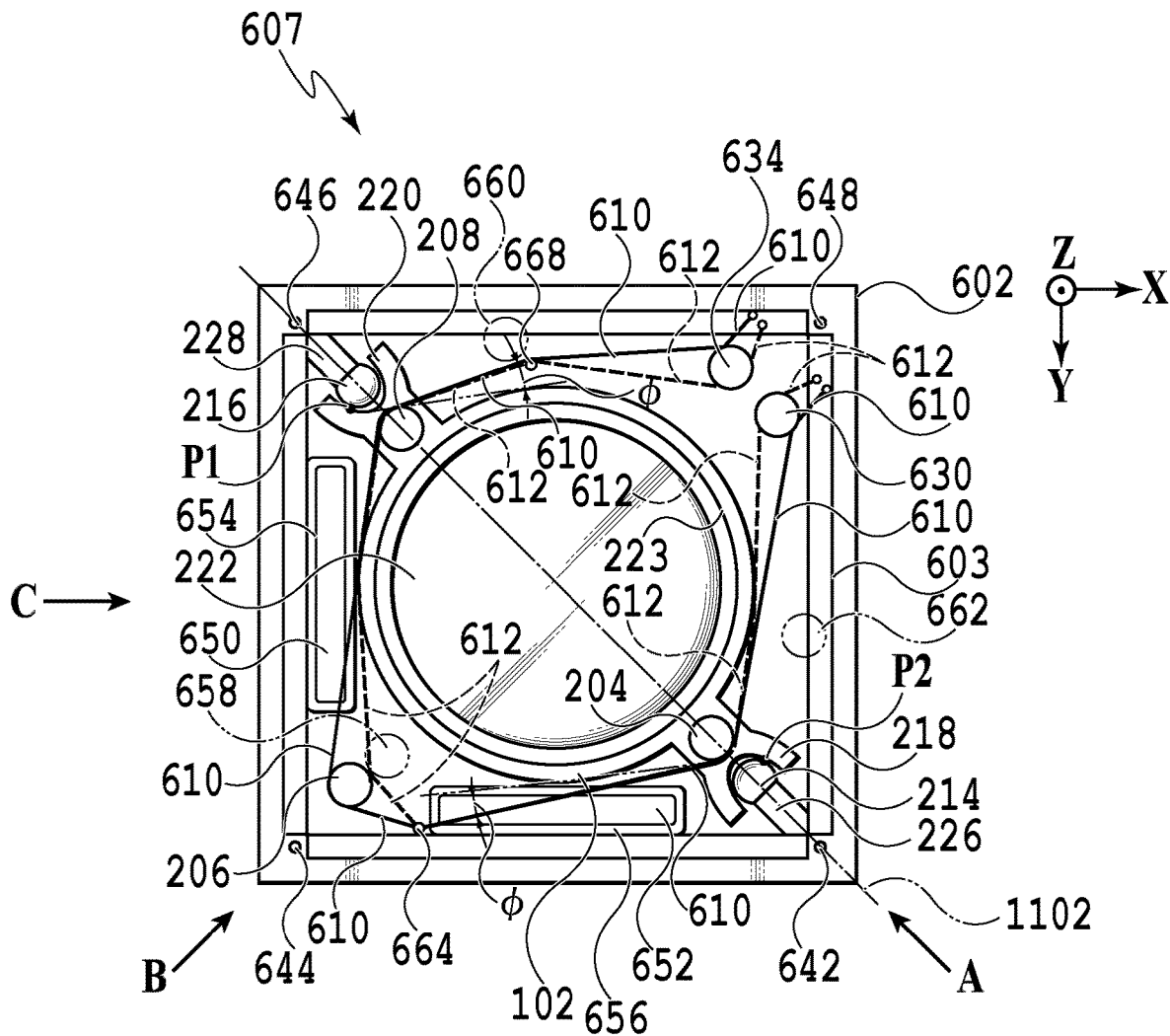
FIG. 9 is a top view of an AF actuator in accordance with an embodiment.

Turning to FIGS. 9 and 10, a second embodiment will be described in detail below. FIG. 9 is a side view of a lens position adjustment device, where the same or similar components as those in FIGS. 2 and 4 are indicated by the same or similar reference signs. An image stabilization device 607 includes a housing 603 of an AF actuator 606. The housing 202 of the AF actuator 606 is attached to the housing 602 of the image stabilization device 607 via the springs 642, 644, 646, and 648 so as to be biased toward the bottom portion of the housing 602.

In accordance with the operation according to the second embodiment, a three (3) percent change in the length of the SMA wire can be used in the movement of the lens holder in the optical axis direction. Hence, in the example illustrated in FIG. 9, the 3 percent of the distance from the end of the SMA wire to the tension pole can be used in the movement in the optical axis direction.

Referring to FIG. 9, the SMA wire 610 is looped around a tension pole 630, attached to the tension pole 204, extends past the outer side of a pin 664 extending from the bottom portion of the housing, and is then looped around the tension pole 206. The SMA wire 610 looped around the tension pole 206 is further attached to the tension pole 208, extended past the outer side of a pin 668 extending from the bottom portion of the housing, and then looped around a tension pole 634. The SMA wire 612 is looped around the tension pole 630, attached to the tension pole 204, extends past the outer side of the pin 664, and is then looped around the tension pole 206. The SMA wire 612 looped around the tension pole 206 is further attached to the tension pole 208, extended past the outer side of a pin 668 and then looped around the tension pole 634.

Figure 10A:
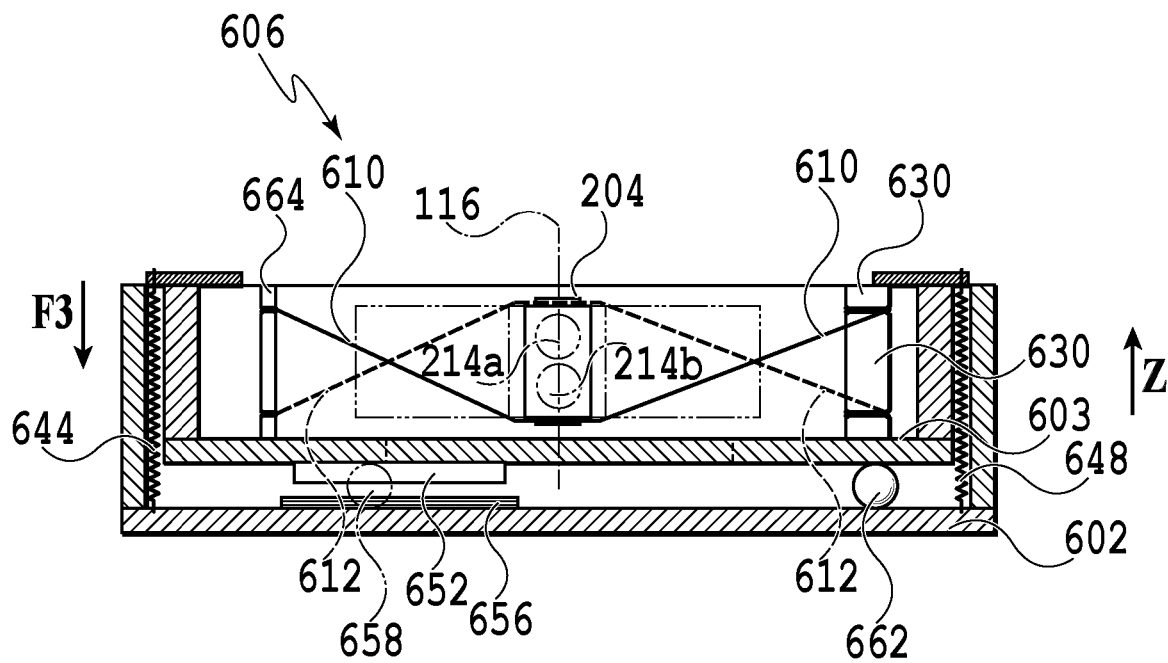
FIGS. 10A and 10B are side views of the AF actuator in accordance with an embodiment.
Figure 10B:
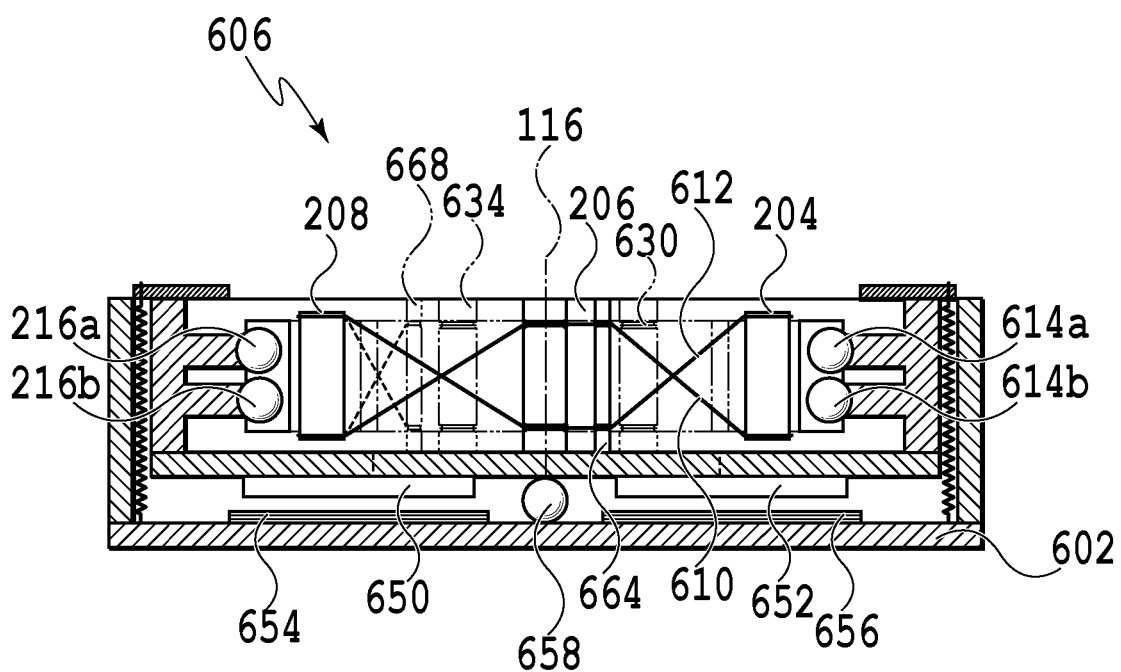

FIG. 10(A) is a side view of the lens position adjustment device illustrated in FIG. 9 viewed in the direction indicated by the arrow A, and FIG. 10(B) is a side view thereof viewed in the direction indicated by the arrow B. By virtue of the configuration illustrated, through controlling the currents flowing in the coils 654 and 656, the magnets 650 and 652 are acted upon by the forces, so that the AF actuator 606 is moved along with the housing 603 in the direction perpendicular to the optical axis (X/Y-axis directions).

Referring again to FIG. 9, the SMA wires 610 and 612 are fixed by the pin 664. The SMA wires 610 and 612 pass the positions indicated by the broken lines in the absence of the pin 664 so as to form a shape symmetrical about the diagonal line 1102 which passes through the middle of the lens 222. However, they are arranged at positions deviated outward by an angle φ with respect to the positions indicated by the broken lines in the presence of the pin 664. In addition, with regard to the tension pole 634 as well, in the same or similar manner, the SMA wire is moved such that it is arranged in a position deviated by an angle φ from the position indicated by the broken lines symmetrical about the diagonal line 1102. Preferably, the angle φ is, for example and not limited to, 15 degrees. The engaging sections of the arm 218 and 220 contact with the balls 214 and 216 by biasing forces by the SMA wires 610 and 612, respectively. The effect obtained by shifting the SMA wires will be described with reference to FIG. 11.

Figure 11:
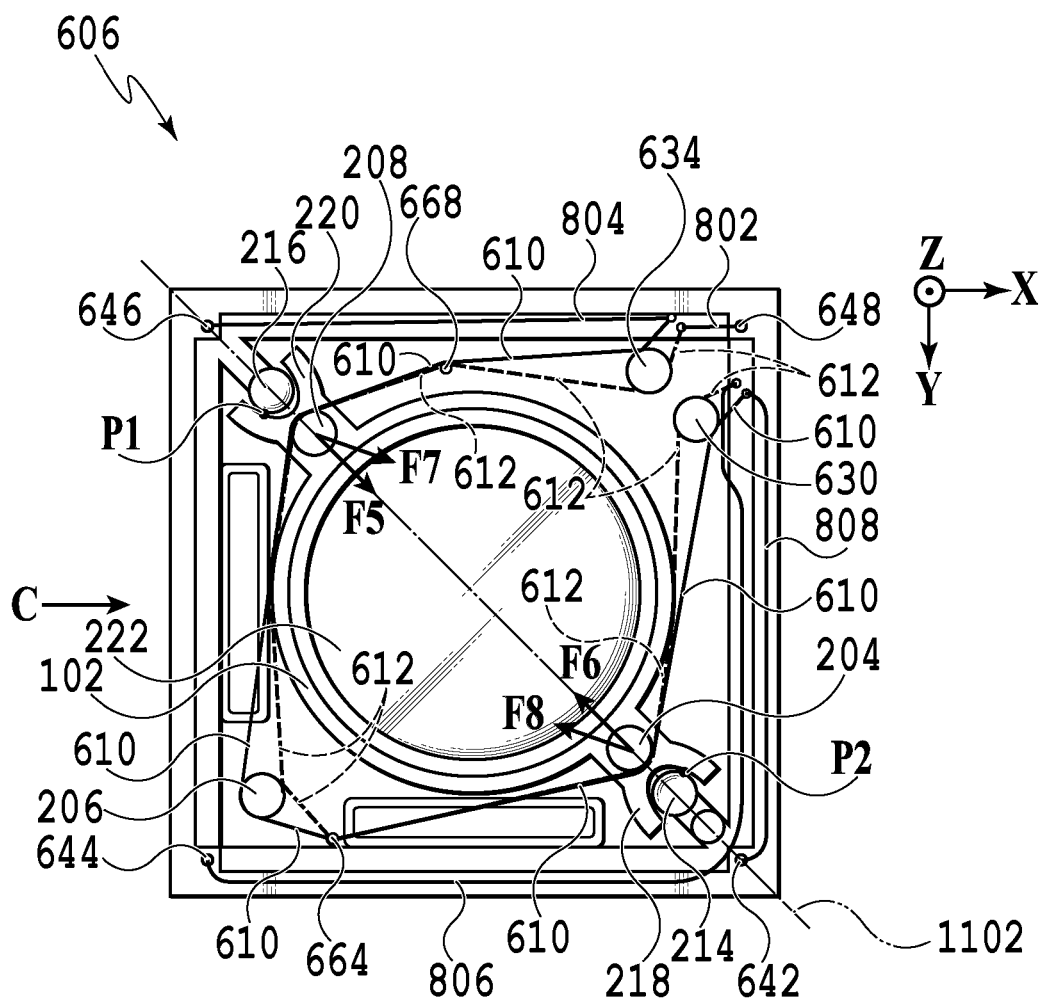
FIG. 11 is a top view of an image stabilization device in accordance with an embodiment.

Referring now to FIG. 11, the orientation of the forces with which the SMA wire 610 and the SMA wire 612 hold the lens holder 102 is deviated by a predetermined angle from the direction from the side to the center of the lens. If the SMA wires 610 and 612 are arranged symmetrically about the diagonal line 1102, then forces F5 and F6 that press the tension poles 204 and 208 act in the direction from the side of the lens 222 toward the center of the lens 222. When the SMA wire is shifted, the force pressing the tension pole will be shifted from F5 and F6 to F7 and F8, respectively. Accordingly, the force that causes the engaging section of the arm 220 to contact the ball 216 will act strongly at the position P1. Likewise, the force causing the engaging section of the arm 218 to contact the ball 214 will act strongly at the position P2. By virtue of these forces, the instability in the horizontal direction due to the engagement looseness between the engaging section and the balls 214 and 216 will be reduced, which makes it possible to achieve more stable arrangement of the lens holder.

Next, the features associated with power supply for the AF actuator illustrated in FIG. 9 will be described below with reference to FIG. 11. The electric power externally supplied via the connector 114 of FIG. 1 is supplied to the SMA wire 612 via the spring 644 and through a conductive wire 806. In addition, the electric power is supplied to the SMA wire 610 via the spring 642 and through the conductive wire 808. In addition, the SMA wire 610 is connected to the spring 646 through the conductive wire 804 and by the conductive wire 804. Further, the SMA wire 612 is connected to the spring 648 through the conductive wire 802. In this manner, a circuit is constructed by connecting the springs 646, 648, 642, and 644 to the power source.

Figure 12:
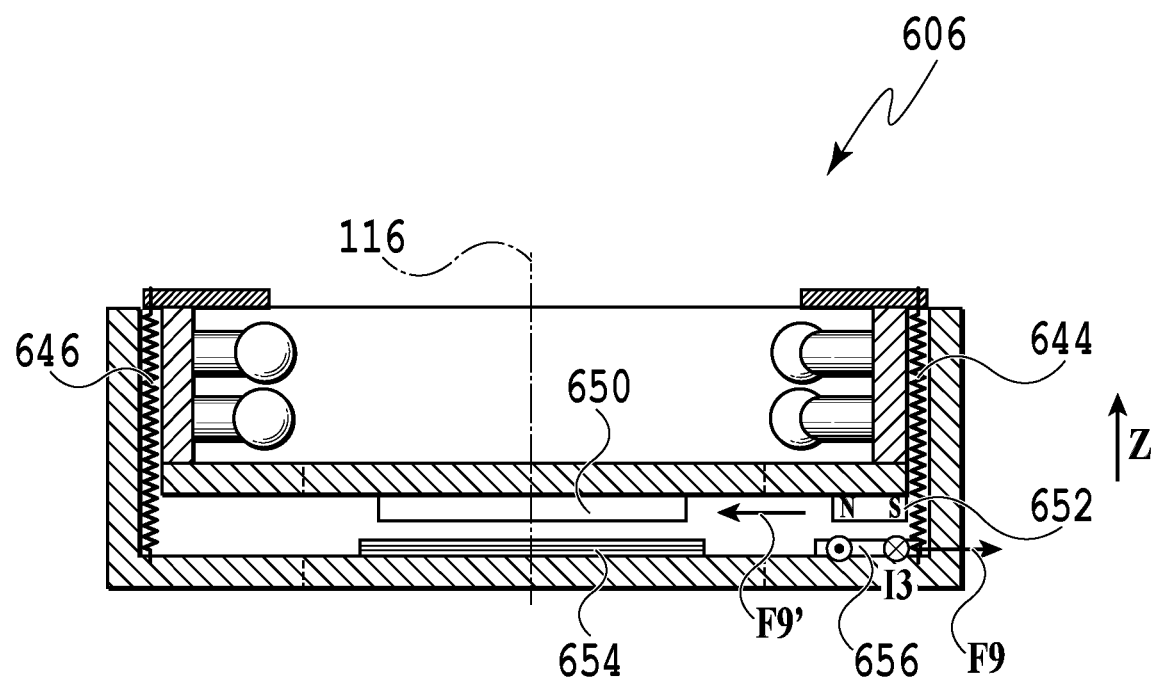
FIG. 12 is a diagram illustrating operation of an image stabilization device in accordance with an embodiment.

Next, the operation of the image stabilization device 607 will be described below with reference to FIG. 12. FIG. 12 is a diagram of the lens position adjustment device of FIG. 9 viewed in the direction indicated by the arrow C. For example, with regard to the coil 656, as illustrated in the same figure, if a current I3 flows therein from the right side of the coil to the distal side in the figure and is output from the left side to the proximal side in the figure, then, in the presence of the magnet 652, a Lorentz force F9 acts toward the right side. However, since the coil 656 is fixed to the housing 602, the magnet 652 will be moved leftward due to a reaction force F9'. As a result of this movement, the AF actuator 606 is moved leftward (in the Y-axis direction). Likewise, by energizing the coil 654, the AF actuator 606 can be moved in the X-axis direction.

In this manner, the driving method for driving the image stabilization device 607 includes the steps of: energizing one coil 656 out of the pair of coils arranged opposed to the pair of magnets 650 and 652 and thereby causing the lens holder 102 to move along a first axis (Y-axis); and energizing the other coil 654 out of the pair of coils and thereby causing the lens holder 102 to move in a second axis (X-axis).

It should be noted that the image stabilization device 107 illustrated in FIGS. 10 to 12 includes a pair of magnets arranged close to the side of the lens holder, the pair of magnets includes a first magnet and a second magnet, the first magnet being arranged on a first axis perpendicular to the optical axis, the second magnet being arranged on a second axis perpendicular to the optical axis, and includes a pair of coils arranged opposed to the pair of magnets, and the image stabilization device 107 causes the lens holder to be moved by virtue of the pair of magnets and the pair of coils. According to this embodiment, in place of a state of the art configuration according to which a lens holder is fixed by plate springs, the OIS balls are arranged between the AF actuator and the image stabilization device, and further the AF actuator is biased using the springs onto the bottom portion of the housing of the image stabilization device. By virtue of this, the arrangement of the AF actuator is stabilized, and it is made possible to control the image stabilization device using tow magnets.

Figure 13:
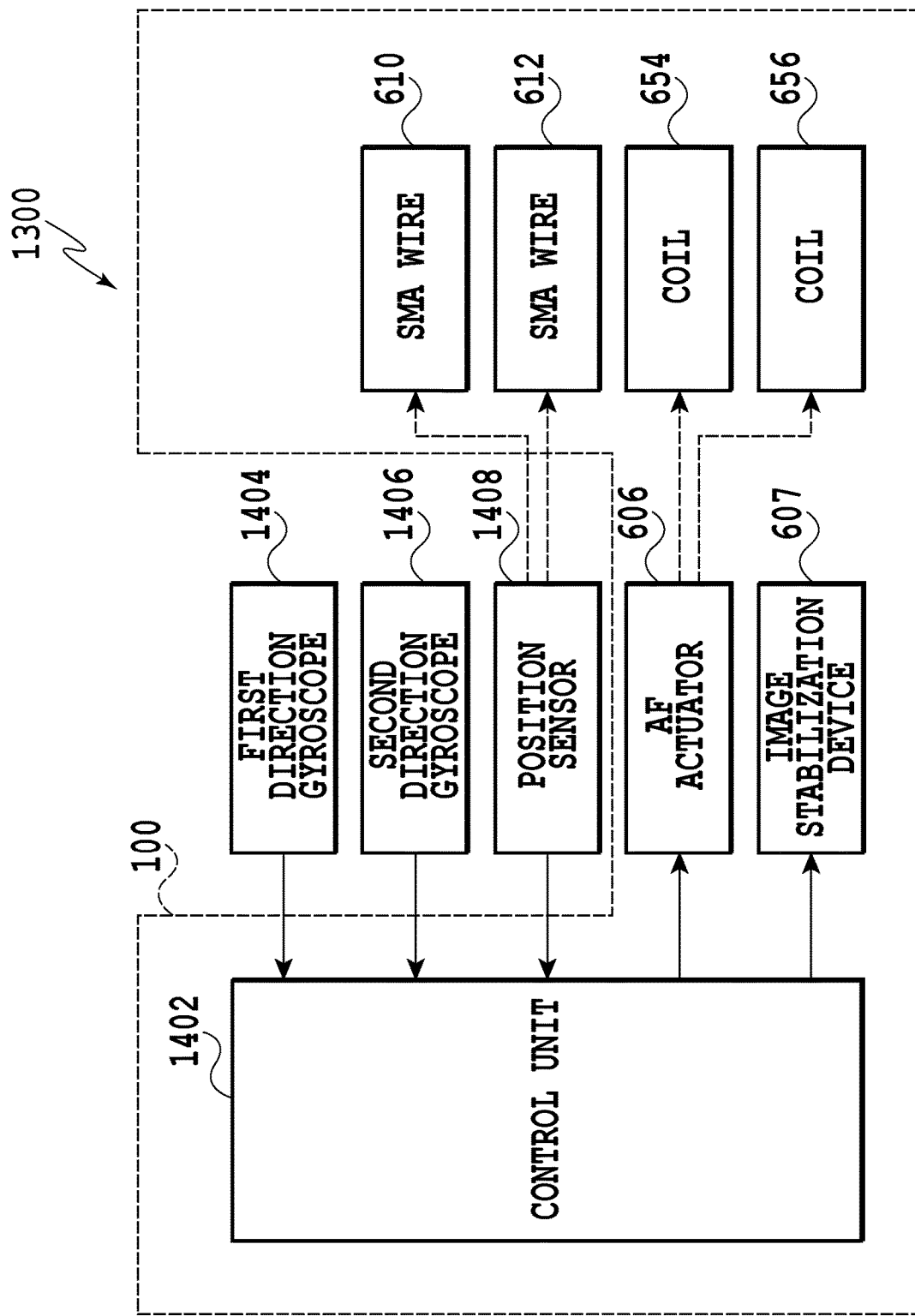
FIG. 13 is a block diagram illustrating a configuration for controlling an AF actuator and an image stabilization device in accordance with an embodiment.

FIG. 13 is a block diagram that illustrates the features associated with controlling of the AF actuator 606 and the image stabilization device 607. An information device 1300 may include a camera module 100, a first direction gyroscope 1404, a second direction gyroscope 1406, and a position detection unit (position sensor) 1408. The camera module 100 may include the SMA wires 610, 612, coils 654, 656, the AF actuator 606, image stabilization device 607, and a control unit 1402. The first direction gyroscope 1404 and the second direction gyroscope 1406 are provided in a housing of the information device. The first direction gyroscope 1404 is configured to detect a vibration in the first direction (X-axis direction) and the second direction gyroscope 1406 is configured to detect a vibration in the second direction (Y-axis direction).

The gyroscope 1404 of the first direction is configured to detect an angular velocity of the first direction (X-axis direction) and output a first angular velocity signal indicative of the first direction (X-axis direction) angular velocity that has been detected. The second direction gyroscope 1406 is configured to detect an angular velocity of the second direction (Y-axis direction) and output a second angular velocity signal indicative of the second direction (Y-axis direction) angular velocity that has been detected. The first and second angular velocity signals are delivered to the control unit 1402.

A position detection signal from a position sensor 1408 is further delivered to the control unit 1402.

The control unit 1402 is configured to output, on the basis of the position detection signals, a control signal that instructs offsetting of the vibration(s) calculated from the angular velocity signals that have been received from the first direction gyroscope 1404 and the second direction gyroscope 1406. The control signal is delivered to the image stabilization device 607. The image stabilization device 607 energizes, as has been described in the foregoing, the coils 654 and 656 and causes the position of the AF actuator 607 to be moved in the X-axis direction and the Y-axis direction.

In addition, the control unit 1402 transmits the control signal to the AF actuator 606. As described above, the AF actuator 606 controls the SMA wires 610 and 612 in accordance with the control signal and causes the lens holder to be moved along the optical axis.

Figure 14:
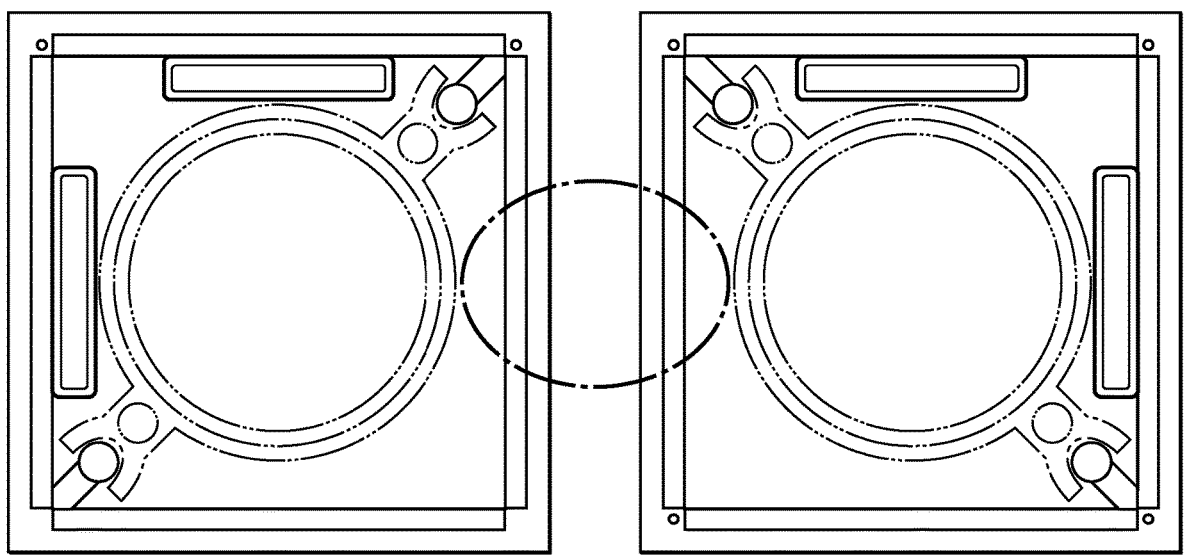
FIG. 14 is a top view of an image stabilization device in accordance with another embodiment of the present invention.

FIG. 14 illustrates another possible embodiment. FIG. 14 is a top view of the lens position adjustment system that implements the lens position adjustment device illustrated in FIG. 9 on a twin-lens camera, where the lens position adjustment device includes four magnets arranged symmetrically about the center. In contrast to traditional lens position adjustment devices, the lens position adjustment device illustrated in FIG. 9 includes two magnets, and the lens position adjustment device is arranged such that a pair of the magnets of the lens position adjustment device are spaced from the other pair of the magnets of the lens position adjustment device. By arranging two lens position adjustment devices in this manner, interference of the magnetic fields does not occur at the neighboring regions of the lens position adjustment device indicated by the broken line, so that it is made possible to achieve more accurate camera shake corrections.

It should be noted that three or more lens position devices according to the embodiments can be implemented on an information device. In this case, at least one pair and another pair of the magnets may be arranged spaced from each other.

It will be appreciated upon reading of this specification that a possible embodiment directed to a device and a possible embodiment directed to a method are based on the same or similar concepts and the same or similar technical effects will be achieved by the method embodiment as well as the device embodiment. With regard to the specific principles, the descriptions associated with the device embodiment may be referred to in the context of the method embodiment as well, detailed explanations of which will not be provided herein.

Further, a method of driving a lens position adjustment device can be implemented on a computer by reading and executing instructions of a computer program stored in a storage device of the computer. Here, the storage device may include a wide variety of a computer-readable storage medium such as RAM (Random Access Memory), ROM (Read Only Memory), removable or non-removable hard disk and the like.

It will be appreciated that what has been disclosed in the foregoing only contains exemplary embodiments of the present invention and in no way intends to delimit the scope of protection of the present invention. It will be appreciated by those skilled in the art that the foregoing embodiments and all or part of the processes implementing the equivalent modified examples made within the scope of claims of the present invention will also fall within the scope of the present invention.

The invention claimed is:

1. A camera module comprising:
a lens holder comprising an engaging section;
a lens held by the engaging section, wherein the lens comprises an optical axis;
a first shape memory alloy (SMA) wire coupled to the lens holder and configured to:
energize the first SMA wire; and
control a force to move the lens holder in a first direction along the optical axis;
a second SMA wire coupled to the lens holder and configured to control the force to move the lens holder in a second direction along the optical axis, wherein the second direction is opposite to the first direction; and
a housing comprising a guiding section,
wherein the engaging section is configured to engage with the guiding section to enable the guiding section to move the lens holder along the optical axis,
wherein the first SMA wire and the second SMA wire bias the lens holder at a position biased inward from a side of the lens holder,
wherein an orientation of an inwardly biasing force is deviated by a predetermined angle from a direction from the side to a center of the lens, and
wherein the engaging section and the guiding section are configured to contact each other by the inwardly biasing force.

2. The camera module of claim 1, wherein the first SMA wire and the second SMA wire are configured to bias the lens holder at two positions symmetrical about the center of the lens.

3. The camera module of claim 2, wherein the first SMA wire and the second SMA wire are configured to hold the lens holder.

4. The camera module of claim 1, wherein the first SMA wire and the second SMA wire are configured to contract and increase the force to move the lens holder in a direction of an increased moving force when energized.

5. The camera module of claim 1, wherein the engaging section is disposed at an end of an arm extending outward from a side of the lens holder, and wherein the guiding section is disposed at an end of a guide-support section extending inward from an inner wall of the housing.

6. The camera module of claim 1, wherein the guiding section comprises two guiding sections disposed in a direction along the optical axis.

7. The camera module of claim 1, wherein either the engaging section or the guiding section is of a ball-shaped member, and wherein the other of the engaging section or the guiding section is of a shape and dimension to surround the ball-shaped member.

8. The camera module of claim 1, further comprising a supporting section disposed in the housing and configured to support the first SMA wire and the second SMA wire, wherein a first end of the first SMA wire, a second end of the second SMA wire, and the supporting section are configured to hold the lens holder.

9. The camera module of claim 8, wherein the supporting section comprises a groove configured to support the first SMA wire and the second SMA wire.

10. The camera module of claim 9, wherein the first SMA wire and the second SMA wire are configured to loop around the groove with two or more turns.

11. The camera module of claim 9, further comprising grooves disposed at two locations in the supporting section to support the first SMA wire and the second SMA wire such that the first and second SMA wires are separated from each other.

12. A terminal device comprising:
 a camera module comprising:
  a lens holder comprising an engaging section;
  a lens, held by the engaging section, wherein the lens comprises an optical axis;
  a first shape memory alloy (SMA) wire coupled to the lens holder and configured to energize the first SMA wire and control a force to move the lens holder in a first direction along the optical axis;
  a second SMA wire coupled to the lens holder and configured to energize the second SMA wire and control the force to move the lens holder in a second direction along the optical axis, wherein the second direction is opposite to the first direction; and
  a housing comprising a guiding section,
  wherein the engaging section is configured to engage with the guiding section to enable the guiding section to move the lens holder along the optical axis,
  wherein the first SMA wire and the second SMA wire further bias the lens holder at a position biased inward from a side of the lens holder,
  wherein an orientation of an inwardly biasing force is deviated by a predetermined angle from a direction from the side to a center of the lens, and
  wherein the engaging section and the guiding section are configured to contact each other by the inwardly biasing force.

13. The terminal device of claim 12, wherein the first SMA wire and the second SMA wire are configured to:
 hold the lens holder; and
 bias the lens holder at two positions symmetrical about the center of the lens.

14. The terminal device of claim 12, wherein the engaging section is disposed at an end of an arm extending outward from a side of the lens holder, and wherein the guiding section is disposed at an end of a guide-support section extending inward from an inner wall of the housing.

15. The terminal device of claim 12, wherein either of the engaging section or the guiding section is of a ball-shaped member, and wherein the other of the engaging section or the guiding section is configured to surround the ball-shaped member.

16. The terminal device of claim 12, further comprising a supporting section disposed in the housing and configured to support the first SMA wire and the second SMA wire, wherein the first SMA wire, the second SMA wire, and the supporting section are configured to hold the lens holder, wherein the lens holder is held between ends of the first SMA wire and the second SMA wire and the supporting section, wherein the supporting section comprises a groove configured to support the first SMA wire and the second SMA wire, wherein the first SMA wire and the second SMA wire are configured to loop around the groove with two or more turns, and wherein the groove is disposed at two locations in the supporting section to support the first SMA wire and the second SMA wire such that the first SMA wire and the second SMA wire are separated from each other.

17. A lens position adjustment device comprising:
 a lens holder comprising an engaging section;
 a lens held by the engaging section, wherein the lens comprises an optical axis;
 a first shape memory alloy (SMA) wire coupled to the lens holder and configured to:
  energize the first SMA wire; and
  control a force to move the lens holder in a first direction along the optical axis;
 a second SMA wire coupled to the lens holder and configured to control the force to move the lens holder in a second direction along the optical axis, wherein the second direction is opposite to the first direction; and
 a housing comprising a guiding section,
 wherein the engaging section is configured to engage with the guiding section to enable the guiding section to move the lens holder along the optical axis,
 wherein the first SMA wire and the second SMA wire bias the lens holder at a position biased inward from a side of the lens holder,
 wherein an orientation of an inwardly biasing force is deviated by a predetermined angle from a direction from the side to a center of the lens, and
 wherein the engaging section and the guiding section are configured to contact each other by the inwardly biasing force.

18. The lens position adjustment device of claim 17, wherein the first SMA wire and the second SMA wire are configured to bias the lens holder at two positions symmetrical about the center of the lens.

19. The lens position adjustment device of claim 17, wherein the first SMA wire and the second SMA wire are configured to hold the lens holder.

20. The lens position adjustment device of claim 17, wherein the first SMA wire and the second SMA wire are configured to contract and increase the force to move the lens holder in a direction of an increased moving force when energized.

* * * * *